(12) United States Patent
Berrios et al.

(10) Patent No.: US 6,534,705 B2
(45) Date of Patent: Mar. 18, 2003

(54) METHODS AND APPARATUS FOR BEAMING POWER

(75) Inventors: Jesus Berrios, Daly City, CA (US); Eric L. Cox, Burlingame, CA (US); Terry J. Porter, Ridgecrest, CA (US)

(73) Assignee: Power Beaming Corporation, Burlingame, CA (US)

( * ) Notice: Subject to any disclaimer, the term of this patent is extended or adjusted under 35 U.S.C. 154(b) by 0 days.

(21) Appl. No.: 09/912,775

(22) Filed: Jul. 24, 2001

(65) Prior Publication Data

US 2002/0046763 A1 Apr. 25, 2002

Related U.S. Application Data

(60) Provisional application No. 60/242,879, filed on Oct. 23, 2000.

(51) Int. Cl.[7] .......................... H01L 31/042; B64G 1/00
(52) U.S. Cl. .................. 136/292; 136/244; 136/291; 244/173; 244/1 R; 323/906; 323/221; 322/2 R
(58) Field of Search ................. 136/244, 291, 136/292; 244/173, 1 R; 323/221, 906; 322/2 R

(56) References Cited

U.S. PATENT DOCUMENTS

| | | | |
|---|---|---|---|
| 3,825,211 A | 7/1974 | Minovitch | |
| 3,986,690 A | 10/1976 | Milling | |
| 4,078,747 A | 3/1978 | Minovitch | |
| 4,943,811 A | 7/1990 | Alden et al. | |
| 4,955,562 A | 9/1990 | Martin et al. | |
| 5,074,489 A | 12/1991 | Gamzon | |
| 5,223,781 A | 6/1993 | Criswell et al. | |
| 5,248,931 A | 9/1993 | Flesner et al. | |
| 5,260,639 A | * 11/1993 | De Young et al. | 322/2 R |
| 5,503,350 A | 4/1996 | Foote | |
| 5,652,750 A | 7/1997 | Dent et al. | |
| 5,685,505 A | * 11/1997 | Meckler | 244/169 |
| 5,870,422 A | 2/1999 | Florentino et al. | |
| 5,883,916 A | 3/1999 | Lohn et al. | |
| 5,918,305 A | 6/1999 | Livingston | |
| 5,957,409 A | * 9/1999 | Castiel et al. | 244/158 R |
| 5,974,072 A | 10/1999 | Hartlove et al. | |
| 5,982,139 A | 11/1999 | Parise | |
| 6,010,640 A | 1/2000 | Beshore | |
| 6,014,922 A | 1/2000 | Livingston | |
| 6,045,089 A | 4/2000 | Chen | |
| 6,046,402 A | * 4/2000 | More | 136/248 |
| 6,147,296 A | * 11/2000 | Freundlich | 136/255 |
| 6,364,253 B1 | * 4/2002 | Cavanagh | 244/190 |
| 6,367,259 B1 | * 4/2002 | Timm | 60/641.8 |
| 6,407,535 B1 | * 6/2002 | Friedman et al. | 322/2 R |

OTHER PUBLICATIONS

"Beam Power to Space," http://powerweb.grc.nasa.gov/psc/doc/beams.html (Apr. 5, 2000).
"Selected Bibliography of NASA Glenn Papers about Laser Power Beaming.", Feb. 1999.
Broad, William J., "Military is Hoping to Test–Fire Laser against Satellite," *The New York Times* (Sep. 1, 1997).
United States Information Agency, "Early Report, Oct. 22, 1997, U.S. Laser Weapon Test." (Oct. 22, 1997).

* cited by examiner

*Primary Examiner*—Alan Diamond
(74) *Attorney, Agent, or Firm*—Fish & Neave; Nicola A. Pisano; Vinay V. Joshi

(57) ABSTRACT

Methods and apparatus for beaming power from one location to another are provided. Energy is used to power one or more lasers to provide a coherent, wide-aperture beam, which is directed to the receiving platform. Photovoltaic cells on the receiving platform convert energy of the laser beam into electrical energy. Receiving platforms are provided that take advantage of the higher energy density in the laser beam.

20 Claims, 4 Drawing Sheets

METHODS AND APPARATUS FOR BEAMING POWER

CROSS-REFERENCE TO RELATED APPLICATIONS

The present application claims the benefit of U.S. provisional patent application No. 60/242,879, filed on Oct. 23, 2000, the disclosures of which is incorporated herein by reference in its entirety.

FIELD OF THE INVENTION

This invention relates to methods and apparatus for beaming power from one location to another, and in particular to methods and apparatus for beaming power from a power generating station to a remote receiver by using one or more lasers.

BACKGROUND OF THE INVENTION

Providing power to remotely located devices is problematic. For stationary devices, such as a seismic data collection facility, it may be possible to install power transmission lines. However, this may be prohibitively expensive, as well as environmentally and aesthetically undesirable. For mobile devices, such as aircraft and satellites, the use of power cables is not possible.

A practical means of providing power to such devices is to generate the power locally using photovoltaic systems that use arrays of photovoltaic cells, also called solar cells, to convert energy in the form of sun light into useful electrical energy. Such systems have found widespread use in, for example, satellites. In addition, aircraft are being designed that can stay aloft for extended periods using electricity generated from solar energy.

However, the relatively poor conversion efficiency of photovoltaic cells is a disadvantage when using them to power objects at high altitude or in orbit. The poor conversion efficiency of photovoltaic cells necessitates the use of large arrays of solar cells to produce adequate electrical power for on board equipment. As a result, heavy and complicated mechanisms are needed so that these large photovoltaic arrays can be folded during the launch of a satellite and then deployed when the satellite is on station. In addition, photovoltaic cells become less efficient as they age. Thus, solar arrays for satellites must be designed to provide extra capacity at launch to compensate for lifetime losses in conversion efficiency. The extra array area and the mechanisms needed to deploy the arrays add to the weight of the satellite and, therefore, to the cost of launching the satellite. Because larger photovoltaic arrays require commensurately larger and heavier deployment mechanisms, there is an increased weight penalty for large arrays.

It would, therefore, be desirable to provide methods and apparatus for supplying power to aircraft and satellites that reduce or eliminate the need for folding photovoltaic arrays.

It would be desirable to provide methods and apparatus for extending the useful lifetime of existing satellites.

It would also be desirable to provide methods and apparatus for supplying supplementary power to existing satellites and electric aircraft.

It would also be desirable to provide methods and apparatus for reducing the size of a photovoltaic array required to provide adequate electrical power to a high altitude or space-based platform.

In addition, it would be desirable to provide an efficient and light weight means of providing electrical power to a high altitude or space-based platform.

It would also be desirable to provide methods and apparatus that enable the development of aircraft, satellites, spacecraft, and other vehicles and devices that are more efficiently and economically powered than are current designs.

SUMMARY OF THE INVENTION

It is, therefore, an object of the invention to provide methods and apparatus for supplying power to aircraft and satellites that reduce or eliminate the need for folding photovoltaic arrays.

It is also an object of the invention to provide methods and apparatus for extending the useful lifetime of existing satellites.

It is another object of the invention to provide methods and apparatus for supplying supplementary power to existing satellites and electric aircraft.

It is also an object of the invention to provide methods and apparatus for reducing the size of a photovoltaic array required to provide adequate electrical power to a high altitude or space-based platform.

It is an additional object of the invention to provide an efficient and light weight means of providing electrical power to a high altitude or space-based platform.

It is another object of the invention to provide methods and apparatus that enable the development of aircraft, satellites, spacecraft, and other vehicles and devices that are more efficiently and economically powered than are current designs.

These and other objects and advantages of the invention are achieved by using a system of one or more lasers to transmit power from a location where power is readily available to a remote location where power is scarce. The system of lasers transmits optical power in the form of laser beams in sufficient quantities to be useful for various purposes at the receiving platform, such as powering equipment, propelling vehicles, and other power consuming uses. A beam direction and guidance system maintains the beam upon the power-receiving device.

BRIEF DESCRIPTION OF THE DRAWINGS

The above and other objects and advantages of the invention will be apparent upon consideration of the following detailed description, taken in conjunction with the accompanying drawings, in which like reference numbers refer to like parts throughout, and in which.

DETAILED DESCRIPTIONS OF THE INVENTION

Figure 1:
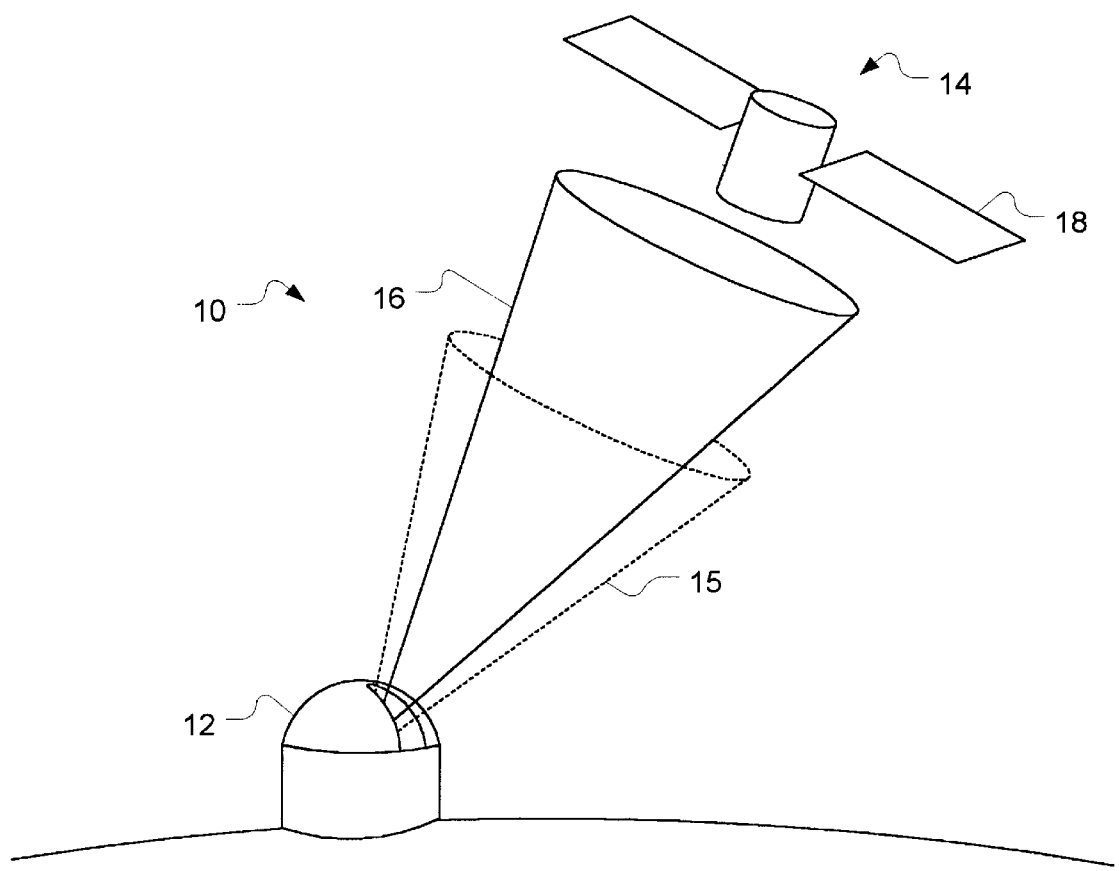
FIG. 1 is a schematic representation of a system for beaming power to a satellite in accordance with the principles of the present invention.

The present invention provides a system for transmitting optical power between a transmitter on the surface of the earth and a receiving platform above the earth, either within the atmosphere or above the atmosphere, in space. As shown in FIG. 1, power beaming system 10 includes optical power emitter 12 which transmits power to receiving platform 14 in the form of laser beam 16. Optical power emitter 12 is a device which provides an optical power beam having a controllable beam size and power. In addition, the power beam must be sufficiently coherent that a suitable optical spot size is realized at a target altitude.

Optical power emitter 12 includes one or more lasers coupled with appropriate optics so that laser beam 16 has the necessary beam diameter and adequate coherency to produce a desired spot size at the altitude of receiving platform 14. Any type of laser may be used to implement the present invention including among others, solid state lasers or liquid state lasers. The emitter may include a number of independent or coupled emitters, or other emitter systems that constitute an apparent aperture of optical emission.

Photovoltaic arrays 18, commonly called solar arrays, on receiving platform 14 comprise arrays of photovoltaic cells that receive the energy carried by laser beam 16 and convert the beam energy into usable electrical power. Photovoltaic arrays 18 are located and oriented so as to intersect laser beam 16 and receive the optical power being transmitted from optical power emitter 12. To maximize energy reception, portions of receiving platform 14 may be made transparent or reflective, and photovoltaic arrays 18 may be oriented and configured to take advantage of reflection or refraction of laser beam 16 from receiving platform 14. Such reflection or refraction may also be used to correct, or shape, laser beam 16, or other incident light energy. In addition, photovoltaic array 18 may be oriented to enhance the capture and conversion to usable energy of any incident solar or other suitable radiation, including any optical energy reflected from or otherwise generated from or by the earth.

Figure 2:
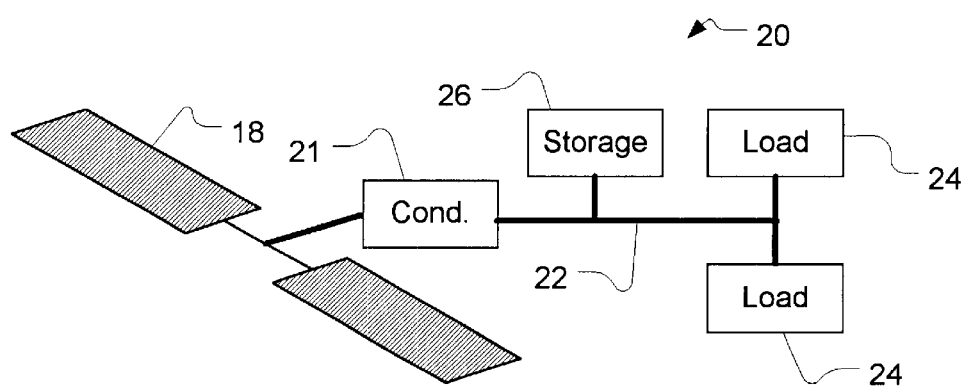
FIG. 2 is a simplified schematic block diagram of a satellite power system.

Receiving platform 14 typically includes an electrical system, such as illustrative electrical system 20 of FIG. 2. Power conditioner 21 receives electrical power from photovoltaic arrays 18 and filters and regulates the power before supplying it to electrical bus 22. Electrical devices 24 such as radio receivers and transmitters, command and control systems, attitude and altitude control systems, and the like are connected to bus 22 to receive electrical power. Storage system 26, which may be a battery, fuel cell, or similar device, is used to store electrical energy when photovoltaic arrays 18 are providing more electrical power than is needed by electrical devices 24. Energy stored in storage system 26 may then be used during periods when photovoltaic arrays 18 do not provide sufficient power for electrical devices 24.

For example, a battery may provide electrical power during interruptions in laser beam 16, such as when power is being sent to another receiving platform or during maintenance on optical power emitter 12. Preferably, photovoltaic arrays 18 are also responsive to solar radiation, so that solar energy may be converted to electrical power and thereby contribute to the power available on receiving platform 14. Solar radiation may thus act as a supplemental energy source that provides useable backup power for short-term interruptions, or provides power needed for minimum operation of receiving platform 14 during extended outages.

Figure 3:
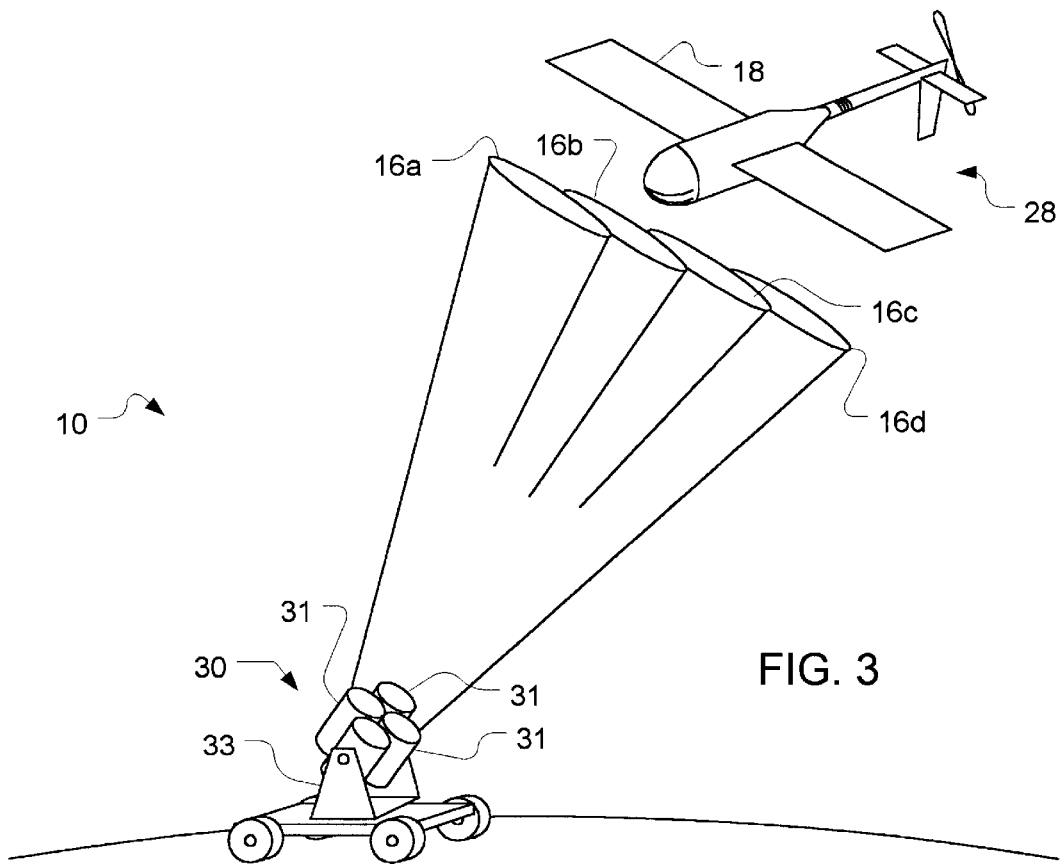
FIG. 3 is a simplified representation of an alternative embodiment of the present invention.

In a first preferred embodiment of power beaming system 10, optical power emitter 12 includes an array 30 of closely spaced lasers 31 as shown in FIG. 3. Individual lasers 31 are oriented so that their beams are substantially parallel to one another. This may be accomplished by rigidly mounting lasers 31 to a common frame. While individual lasers may not have sufficient power capacity to meet the power demands of receiving platform 14, the total capacity of laser array 30 is sufficient to meet those power demands.

Preferably, lasers 31 are common diode pumped solid-state systems using Nd:YAG rods, slabs, or disks as the lasing medium and operated in a fundamental Continuous Wave (CW) Infrared or Near-Infrared (IR) mode. Although Nd:YAG lasers are preferred, other types of lasers based on other materials may also be used.

Alternatively, lasers 31 may also be operated in a pulsed mode. For example, Nd:YAG lasers may be operated in a pulsed 0.532 micron (green) mode. This is not as desirable as CW IR operation, because typical photovoltaic cells require some small time, on the order of milliseconds after illumination, to begin producing useful electrical energy. As a result, the initial portion of each laser pulse is not converted to useful electrical energy and is wasted, thus, reducing system efficiency. However, the conversion efficiency of a photovoltaic cell may be good enough at the shorter wavelengths to make pulse mode operation acceptable. Furthermore, the thermal load for the cooling the laser pump diodes is reduced in a pulsed laser system. This reduces the need for a very high efficiency pump diode thermal management system and also offers some improvement in laser efficiency.

To compensate for the reduced efficiency of pulse mode operation, two or more sets of lasers 31 may be pulsed in alternation so as to provide apparently continuous illumination and thereby increase the electrical energy output of photovoltaic array 18. In addition, transient effects, such as electronic ringing in the photovoltaic array, are reduced, and the problem of current generating and non-current generating photovoltaic cells in series with each other is mitigated.

To aim laser beam 16 at receiving platform 14, a mechanism for directing laser beam 16 is provided. For systems in which laser array 30 is physically small, such as systems for transmitting power to airborne platforms, laser array 30 may be mounted on gimbaled platform 33 so that laser array 30 may be pointed in any desired direction. Safety interlocks would preclude operation of lasers 31 when laser array 30 was pointed to an unsafe azimuth or elevation. For larger systems, such as those used for satellites in high earth orbits, a beam director may be used to direct laser beam 16 to receiving platform 14 as described herein below.

In addition to steering laser array 30 as a unit, lasers 31 may also be pointed individually within the composite laser beam 16. This capability provides a mechanism to alter the far field shape of laser beam 16 to more closely approximate the shape of photovoltaic arrays 18 on receiving platform 14. For example, in FIG. 3, laser beams 16a–d are arranged so that laser beam 16 has a far field shape that approximates the size and shape of the wing of aircraft 28. Furthermore, beams provided by lasers 31 may be positioned within laser beam 16 to minimize the overfill fraction at photovoltaic array 18. The overfill fraction is the amount of overlap at receiving platform 14 between the beams from separate lasers in laser array 30. For space-borne receiving platforms the spot size is about the same dimension as photovoltaic arrays 18, so the ability to position individual lasers in laser array 30 is less significant than for airborne receiving platforms.

Positioning and aiming of individual beams may be done either manually or automatically. For example, jack screws and the like may be used to manually position and aim lasers 31 as part of the setup and alignment of optical power system 10. Such a design has the advantage of simplicity, and is likely, more rugged, easier to maintain, and lower in cost. However, a manual system would be time consuming to realign for use with a receiving platform having photovoltaic arrays 18 in a different configuration.

Preferably, lasers 31 in laser array 30 include automatic mechanisms for re-aiming lasers 31. For example, a system of servo motors, encoders and lead screws may realign and re-aim lasers 31 under the control of a suitably programmed computer. Such a system would provide additional flexibility in beaming power to satellites and other receiving platforms having differing configurations. Such a system would enable lasers 31 to be aligned for optimum power delivery to a satellite having two photovoltaic arrays, and then to be automatically realigned for optimum power delivery to a satellite having four photovoltaic arrays.

When beaming power to receiving platforms above the Earth, laser beam 16 must pass through the atmosphere. Atmospheric turbulence and other effects cause attenuation and spreading of laser beam 16. However, for receiving platforms at altitudes of about 30 km or less, the beam spreading effects of atmospheric turbulence are not important for the sizes of most existing photovoltaic cell arrays. As a result individual optical beams 16a–d that comprise laser beam 16 need to be expanded only to about a diameter of about 25 cm. at the optical emitter to produce a spot size at the receiving platform that approximates the typical dimensions of a photovoltaic array. This is approximately the atmospheric turbulence scale.

Consequently, for airborne receiving platforms, compensation for the effects of atmospheric turbulence is not required, thereby simplifying the beam director significantly to the essence of an ordinary small astronomical telescope. As a result, power beaming systems for atmospheric applications may be both modular and portable. They may be powered by either electric generators or by transmission lines and may be rapidly deployed to support beam powered applications at a variety of altitudes in a wide variety of locations. For example, laser array 30 and gimbaled platform 33 of FIG. 3 may be mounted on trailer 34, or in the bed of a large truck.

Figure 4:
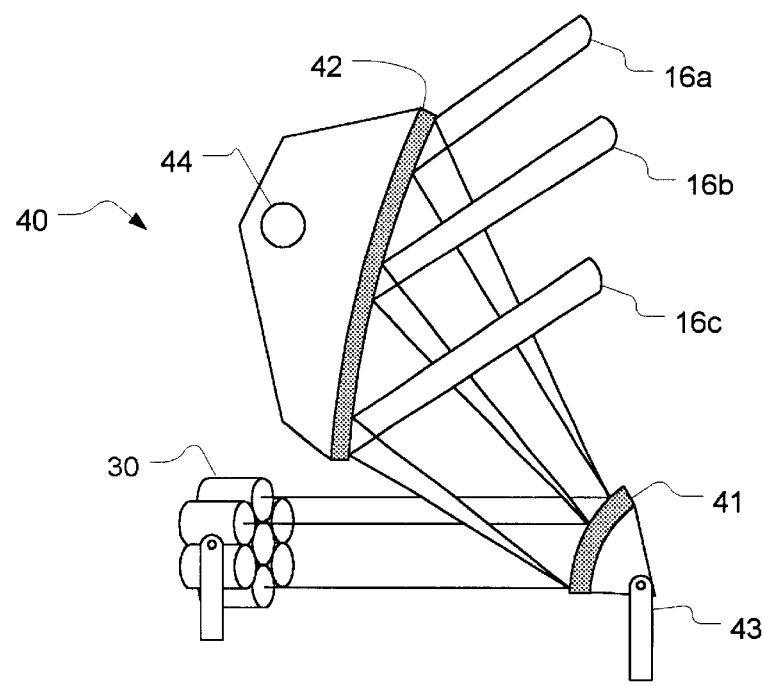
FIG. 4 is a simplified diagram of a beam director for use with the present invention.

When beaming power from the Earth's surface to receivers in space, however, atmospheric effects become more significant. Preferably, a beam director consisting of one or more flexible mirrors or one or more segmented mirrors, and incorporating adaptive optics and other methods, such as atmospheric distortion feedback, is used to correct for atmospheric turbulence and distortion. Referring to FIG. 4, beam director 40 includes one or more lenses and mirrors, arranged to expand or contract the beam to the appropriate aperture and direct the beam at the receiver. An exemplary beam director is shown in FIG. 4, wherein laser beams 16 reflect off primary mirror 41, then are transmitted to secondary mirror 42 which directs them to the receiver. Either the primary or secondary mirror of the beam director, or both, may include movable mounts 43 and 44 to allow laser beams 16a–c to be directed to a desired azimuth and elevation. In addition, laser array 30 and beam director 40 may be mounted on a rotating platform to provide additional flexibility in directing laser beam 16.

An optimal configuration would depend on a number of factors, including the location of optical power emitter 12, the expected location of the receiving platforms, and size, shape, distance and relative motion of the receiving platform. While the power beaming system of the present invention does not normally require adaptive optics to transfer power from the Earth's surface to receivers within the atmosphere, it does exhibit improved performance when such systems are employed.

To transmit power to receiving platform 14, it is necessary for power beaming system 10 to determine the location of receiving platform 14 and point laser beam 16 so that it falls on photovoltaic arrays 18. For receiving platforms other than satellites in geosynchronous orbits, power beaming system 10 must track receiving platform 14 to keep laser beam 16 aimed correctly. For airborne receiving platforms, acquisition and tracking of receiving platform 14 may be accomplished by a sequence of steps, beginning with acquisition, proceeding to coarse and then fine tracking, and ending with aim point selection.

Conventional radar may be used to locate a desired receiving platform and direct a wide-angle optical beam to the receiver. To enhance tracking, receiving platform 14 preferably includes one or more corner cube reflectors. Reflections from the corner cube reflectors may be detected by a photodetector on the ground which provides direction signals enabling an operator or computer to point an infrared video camera and small receiving telescope at receiving platform 14. This then provides feedback for accurate beam direction and guidance.

Because eye safety for optical beams of this power level is important, an integrated safety system is a feature of this invention. Direct beam viewing can cause instantaneous eye damage; and, therefore, a system to prevent the optical beam from intersecting aircraft is essential.

Aside from non-automatic means such as manual observers and wide area radars, a narrow angle radar system with automatic control of the optical power beam is incorporated into this invention. Referring back to FIG. 1, a radar system (not shown) provides a radar beam 15 that is boresighted to laser beam 16. Preferably, the parameters of the radar are selected such that, when an aircraft is detected at the outer edges of radar beam 15, laser beam 16 may be interrupted before the aircraft can intersect it. Laser beam 16 may be interrupted by mechanically closing a shutter, deflecting the beam into a safe direction, or turning off the lasers.

In addition a video camera with a field of view slightly larger than the radar beam may be used to monitor and record the passage of any aircraft. Although the lights of an aircraft may be used for detection during nighttime hours, it is preferred that the camera have infrared capability as well. When the radar senses an aircraft and closes the optical shutter, the video camera is activated to record the safe passage of the aircraft with the power transmission beam shut off until the aircraft safely exits the radar field of view. This entire sequence is recorded on a VCR for insurance purposes. In addition, satellite passage information may be obtained from the United States Space Command Laser Clearing House, so that laser beam 16 can be shuttered to avoid unintended intersection of the beam with other satellites.

Figure 5:
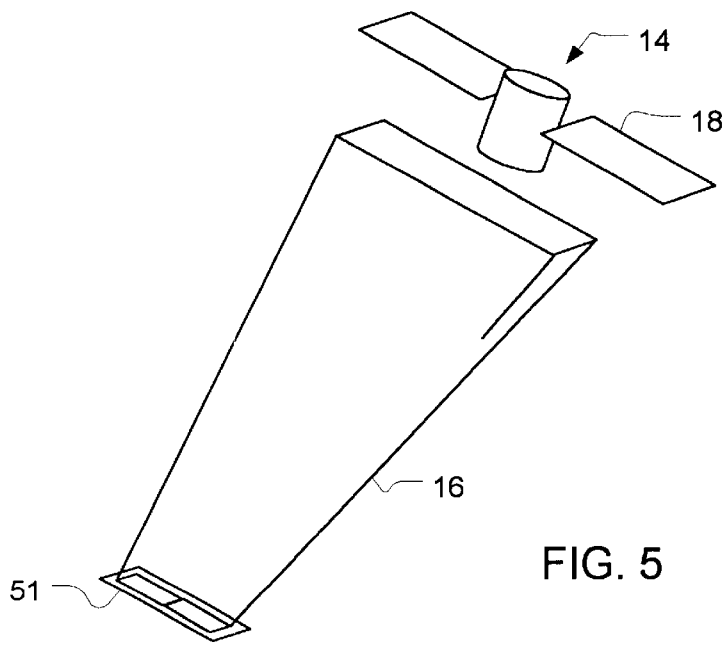
FIG. 5 is another illustrative embodiment of a power beaming system in accordance with the principles of the present invention.

The embodiment of the invention described herein above uses an array of lasers located in close proximity to one another to generate laser beam 16 for transmitting power to receiving platform 14. In another embodiment of the present invention, laser beam 16 is provided by a highly concentrated array of Light Emitting Diodes (LEDs) that have a narrow optical emission angle. Preferably, LED array 51 is formed in a shape of the final far field optical image required as shown in FIG. 5. The photonic emissions of individual LEDs may be corrected by means of external optics to form appropriate beams. The emitted energy of the array as a whole may then be optically shaped into a more concentrated beam of the same shape. At the receiving platform 14, the shape of laser beam 16 matches the shape of photovoltaic arrays 18 minimizing the power beamed past receiving platform 14 and therefore lost into space.

Typically, LED generated beams are of lower power and optical quality than laser devices. As a result beam spread may limit their uses over great distances, such as from the Earth's surface to a receiving platform in space. Nevertheless their relatively low cost, small size, and high reliability may make them particularly attractive for power transmission within the Earth's atmosphere, especially in applications where portability of power beaming emitter 12 may be important.

An additional advantage of LED emitters is that they are capable of emitting laser-like beams at a number of wavelengths. In accordance with the principles of the present invention, an array of LEDs may be operated to simultaneously emit coherent light at multiple wavelengths, or over a range of wavelengths, to match a wider range of wavelengths received by the photovoltaic cells at the receiver. All photovoltaic cells convert photonic energy over a range of wavelengths into electricity, but each type of photovoltaic cell has a maximum conversion efficiency at a specific wavelength, over a number of wavelengths, or over a range of wavelengths. By matching the wavelength of laser beam 16 to the wavelength for which photovoltaic arrays 18 are most efficient usable power transfer is maximized. When operated with LED arrays, the optical power beaming emitters can be operated at optical wavelengths selected from throughout the visible and non-visible optical spectrum. However, this capability to match the photonic wavelengths of the emitter to the conversion spectrum peaks of the receiver is also possible with laser equipment. For example, Nd:YAG lasers, can be operated at optical wavelengths in the range of about 0.5 microns to 1.1 microns.

Figure 6:
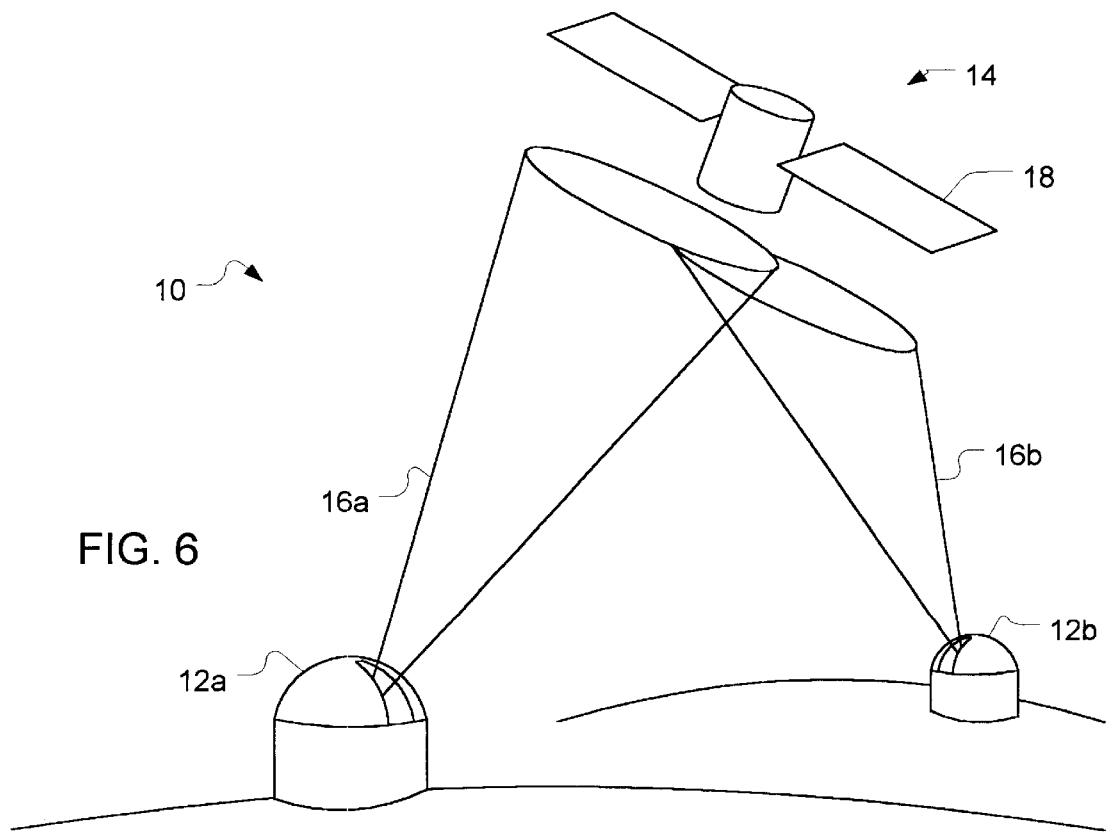
FIG. 6 is embodiment of the present invention using multiple optical power emitters.

Another alternative embodiment of the present invention is shown in FIG. 6, wherein individual optical power emitters 12a and 12b are operated independently from separate geographical locations. Beams 16a and 16b are targeted on and converge on receiving platform 14 so that the combined beams achieve a total beam energy equal to their combined output. An operator or computer may point each optical power emitter at a specific portion of the receiver to minimize the overfill fraction. An on-board or ground-based closed loop tracking circuit maintains the optical pointing to maximize the power beaming efficiency.

This provides a sufficiently high optical power density at receiving platform 14, while the power density of any single beam at or near the power emitters is low. The use of multiple optical power emitters also provides additional flexibility and scheduling of power beaming operations. For instance, optical power emitters 12a and 12b may generally beam power to distinct receiving platforms, but then cooperate to beam power to a single platform on a scheduled basis, or as needed.

The system of the present invention may be used to beam power to a high altitude aircraft or balloon. For example, optical power beaming may be used to send power to an aircraft similar to the Helios aircraft manufactured by AeroVironment of Simi Valley, Calif. The Helios is a solar-powered aircraft designed to fly a payload of scientific data-gathering instruments to ultra-high altitudes of greater than about 60,000 feet. Its wings, having a wingspan of about 60 m and a wing chord of about 5 m, are covered with solar cells which deliver about 30 kW of electrical power to the on-board electrical bus. Of this power, 10 kW powers 14 electric motors, which keep the plane aloft, and the remaining 20 kW recharge onboard batteries. Although the batteries provide some power, their capacity is usually not sufficient to keep an aircraft aloft the entire night. Previously known solar powered aircraft are also generally limited to flights near equatorial latitudes so that the sun angle is large enough to have sufficient incident solar radiation.

Typically a Helios-type aircraft obtains power from solar radiation incident on solar arrays located on the wings of the aircraft. As an alternative, the present invention may be used to beam photonic energy to an aircraft such as the Helios during flight. By optimizing the characteristics of the power beam and the photovoltaic arrays the number of photovoltaic solar cells required to be carried on the aircraft may be reduced. The capacity of batteries or other energy storage devices needed to maintain continuous flight may also be reduced accordingly.

For example, solar cells used on typical solar powered aircraft have a conversion efficiency of about 20–35% at the 1.06-micron and 532 nm wavelengths. This is higher than the best conversion efficiency obtained with broadband solar radiation. The 1.06-micron emission wavelength is preferred and an excellent match for silicon solar cells.

Using an optical power emitter producing a power beam at a wavelength of approximately 1.06 microns the optical emitter would need to deliver only about 30 kW flux to the photovoltaic cells to provide 10 kW of electric power. This could be, for example, the power needed to sustain flight for a Helios-like aircraft. Similarly, an optical flux of 90 kW at the receiving platform would be needed to supply 30 kW of electric power. Taking into account losses, such as atmospheric losses, overspreading losses, and optical losses, the total required optical power emitted by optical power emitter 10 may be in the range of 50–150 kW.

The improved conversion efficiencies obtained by matching the characteristics of the power beam with those of the photovoltaic arrays may also be effectively applied in other situations. For example, many platforms above the earth such as aircraft, balloons, and satellites already on orbit, including low earth orbit and geostationary orbit include photovoltaic arrays to provide electrical power. As these arrays become less efficient due to aging effects, it may become necessary to curtail less important uses of the platform to ensure more important functions have adequate electrical power. In accordance with the principles of the present invention, a power beam of an appropriate wavelength and power may be used to overcome the loss of efficiency and enable the full use of the platform. The use of such existing receiving platforms and their existing photovoltaic cells requires the use of an optical power emitter capable of approximately matching the most effective receiving frequencies of the receiving photovoltaic cells.

As such existing platforms often have power systems designed to operate solely from incident solar energy, optical power emitter 12 only concentrates that amount of optical energy on the platforms receiver necessary to produce usable power without overpowering the existing platform power system. However, over-illuminating existing photovoltaic arrays that may have degraded from environmental exposure, such as from radiation, may extend their power production capacity and thereby extend the operating capabilities and the operational life of the existing receiving platform.

The same efficiency gains may also be considered in the design of new platforms. For example, a satellite may be designed to receive beamed optical energy through a photovoltaic array including cells designed to receive optical energy at a concentration of greater than about solar constant (approximately 1372 W/m²). Such platforms would be able to receive large amounts of power with very small photovoltaic arrays, eliminating or reducing much of the weight and infrastructure required to support photovoltaic arrays that are based on smaller power densities.

The solar constant, often referred to as the sun or solar equivalent, is defined outside the atmosphere as 428 British Thermal Units (BTUs)/hour/square foot (about 1372 Watts/m2) with annual changes in the distance of the earth from the sun accounting for a ±3.5% variation. The solar energy received inside the atmosphere at a given altitude is reduced by the adsorption and scatter of the incident solar energy by the intervening atmosphere. The solar energy is reduced by the amount and density of atmosphere between the receiver and the sun, typically referred to as the air mass. The air mass is defined as the ratio of the actual path length of the suns rays divided by the shorter path length that would be the case if the sun were directly overhead. Clouds, water vapor, ozone, dust and aerosols also attenuate the amount of energy penetrating to a given altitude. For example, near sea level in the southern United States with low humidity and clear, very blue mid-summer skies, the measured peak solar energy is typically on the order of 300 BTUs/hour/square foot.

A significant factor in the propagation of the photonic power to the receiver is the degree of atmospheric turbulence compensation required to keep the power from scattering and overfilling the receiving platforms photovoltaic receiving cells at the mission altitude. The propagation characteristics are determined by the atmospheric turbulence scale, often referred to as the Fried parameter, $r_0$, which under normal sea level conditions is about 5 cm (median value) at the reference wavelength of 500 nm.

At reasonably good sites such as typical astronomical sites at 1 km altitude in the continental United States, this value can be 10–15 cm whereas at the best astronomical sites in the world, i.e. Hawaii at 4 km altitude and parts of Chile at lower altitudes, the value of $r_0$ can be as high as 20–25 cm. Since $r_0$ scales as $\lambda^{6/5}$ where $\lambda$ is the optical wavelength, for the primary case to be considered here, the values of $r_0$ are 12.5 cm, 25–37.5 cm and 50–62.5 cm for the sea level, typical astronomical and best astronomical sites, respectively.

Without any atmospheric correction whatsoever, the theoretical divergence angle of an optical beam projected out of a beam director is given by $(\lambda/d)$ where d is the diameter of the output beam. In the presence of atmospheric turbulence, however, the minimum beam divergence is limited to $(\lambda/r_0)$ when $r_0<d$.

Thus, for an aircraft altitude of about 100,000 feet (30 km), the spot diameter for a perfect beam is 25 cm for the sea level case, 9–13 cm for the reasonable astronomical sites and as low as 5–6 cm for the best astronomical sites. The diameter of the optical power emitter must increase as $r_0$ increases, so the size and cost of the emitter array will increase considerably if those small spot diameters are needed.

However, in all these cases, the spot diameter is smaller than the wing length and more importantly, smaller than the wing chord of, for example, the Helios aircraft. For this typical application mission, the wing chord is approximately 5 m, so the spot diameter is approximately 20 times smaller. This means that in order to illuminate the wing with minimal overfill, the divergence of the photonic beam can be 20 times worse than a perfect beam, or in optical terms that the beam quality of the power transmission beam can be 20 times diffraction limited.

Figure 7:
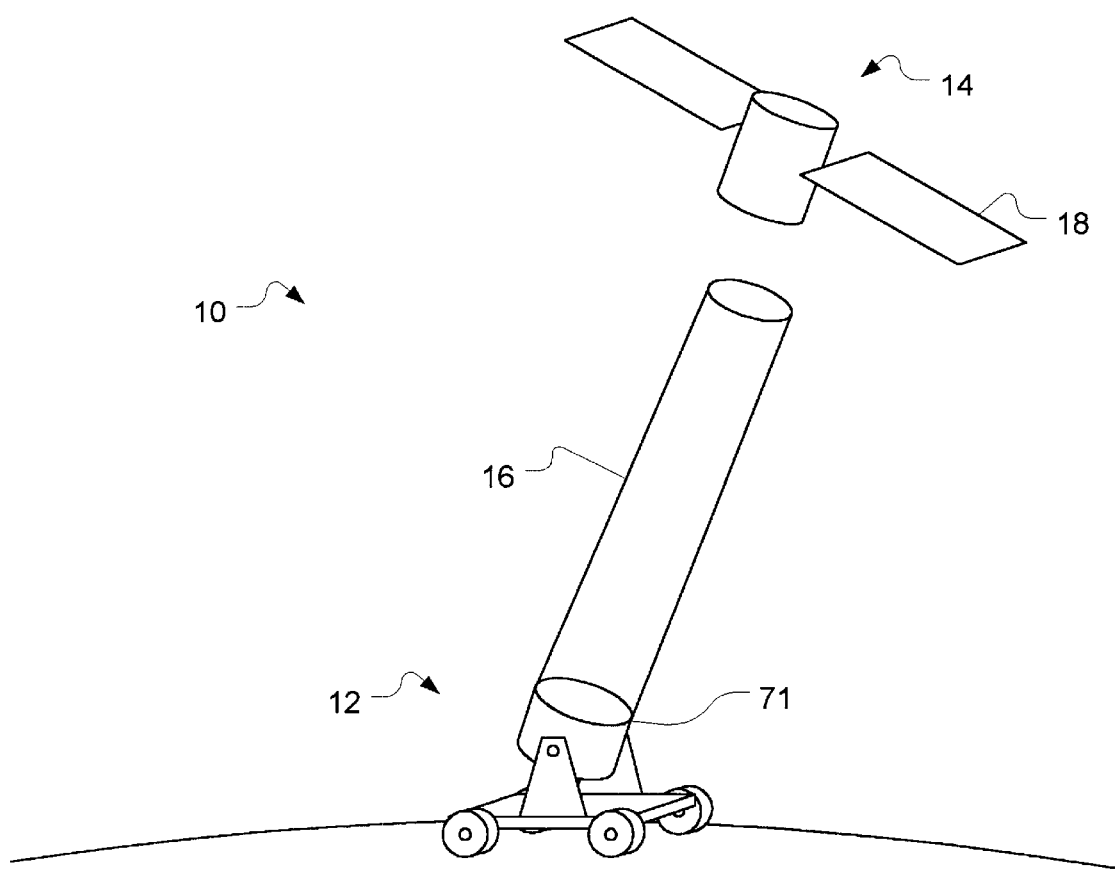
FIG. 7 is an illustrative embodiment of the present invention using a wide aperture laser beam.

Another illustrative embodiment of the present invention uses wide aperture laser 71 for producing coherent, wide aperture beam 72 as shown in FIG. 7. A coherent, wide aperture beam provides better control of beam divergence over long distances improving on the ability to provide power to high altitude platforms, both in the atmosphere and in space. The optical power emitter for this embodiment may be a planar beam emitter or may be multiple beams optically or otherwise combined to produce the required coherent output beam. The optical power emitter, by producing a beam that is both of apparent wide aperture and highly coherent produces a spot or beam diameter at high altitude that is said to be diffraction limited.

Such a system may be represented by the widely known equation $BD=\lambda/DR$, where BD is the spot size of the beam at the receiver, $\lambda$ is the wavelength of the laser light, D is the beam emitter apparent optical diameter, and R is the range. When evaluated, this equation demonstrates that for highly coherent light, the greater the aperture of the laser emitter for any given wavelength, the smaller spot size that is produced at the receiver.

In this embodiment, the laser emitter emits coherent light at an apparently wide optical aperture. The high altitude receiver located on the platform is designed to fit the geometry of the emitted laser beam, and to convert the incident energy into usable and substantial power. In this embodiment, the optical power emitter is comprised of a ND:YAG disk such as is described in U.S. Pat. No. 5,553,088 and generally following the description of generic ND:YAG lasers as described above, but with the distinct advantage of the emitted beam having not only high coherence but also a significant beam diameter, thereby forming the basis for a long range directed beam having a greatly reduced divergence angle and thereby maintaining a concentrated beam over much greater distances than with smaller diameter beams as generated by typical rod-type ND:YAG lasers. Multiple optical power emitters of this type may then be comprised in a variety of geometries and configurations to meet the variety of mission requirements. Such an optical power emitting device reduces the need for a beam directing optic thereby reducing system cost.

It is further a preferred embodiment of the invention to emit a wide aperture beam, which converges on the receiver at altitude. In this manner the beam density near the earth is much less than the beam density at the receiving platform and therefore the inherent risk due to aircraft encountering the beam is greatly reduced. To accomplish this diffused beam several optical power emitters of wide aperture are combined in such a manner as to be separated from one another by at least the distance of their respective beam spread at the receiving platform.

The invention is a system and method for transferring power from the Earth to a receiver platform above the Earth, or otherwise remotely located, for the purpose of providing usable and substantial power to the receiver platform. While the preferred embodiments of the invention are shown and described herein, it is to be distinctly understood that the invention is not limited thereto, but may be otherwise variously embodied and practiced within the scope of the appended claims.

What is claimed is:

1. An apparatus comprising:
    a remote platform including a photovoltaic cell; and an optical power emitter including a plurality of lasers to provide a plurality of laser beams having photonic energy, the plurality of beams being coherent with respect to each other;

wherein the optical power emitter directs the plurality of beams at the platform; and wherein the platform is at an altitude with respect to the optical power emitter.

2. The apparatus of claim 1, wherein the beams include wide aperture beams.

3. The apparatus of claim 2, wherein the wide aperture beams have apertures greater than 10 centimeters.

4. The apparatus of claim 2, wherein the wide aperture beams have apertures in the range of 10 to 10,000 centimeters.

5. The apparatus of claim 2, wherein the average power density within the wide aperture beams is less than 1.4 $kW/m^2$.

6. The apparatus of claim 2, wherein the average power density within the wide aperture beams is greater than 1.37 $kW/m^2$.

7. The apparatus of claim 1, wherein the lasers are operated in a pulsed mode.

8. The apparatus of claim 1, wherein the plurality of lasers includes an array of light emitting diodes.

9. The apparatus of claim 1 wherein the lasers are operated in a continuous mode.

10. The apparatus of claim 1, wherein the photovoltaic cell converts the photonic energy received from the optical power emitter into electrical energy.

11. The apparatus of claim 10, wherein the frequency of the beams is selected to optimize the phonetic energy conversion to electrical energy and minimize the phonetic energy conversion to heat.

12. The apparatus of claim 1, wherein the optical power emitter is located on earth.

13. The apparatus of claim 12, wherein the platform includes a platform for a satellite located outside the earth's atmosphere.

14. The apparatus of claim 12, wherein the platform includes a platform for an aircraft aloft inside the earth's atmosphere.

15. A method for a degraded photovoltaic cell comprising:

overly illuminating the degraded photovoltaic cell with a laser beam to supply the photovoltaic cell with the avenge photonic energy of more than one sun equivalent;

wherein the over-illumination increases the electrical energy production capacity for the degraded photovoltaic cell to approximately the same level as the electrical energy production capacity for a good photovoltaic cell illuminated with the average photonic energy of one sun equivalent.

16. The method of claim 15, including simultaneously illuminating the degraded photovoltaic cell with a laser beam having photonic energy and a solar ray having solar energy.

17. The method of claim 15, wherein overly illuminating the degraded photovoltaic cell extends the lifetime of the degraded photovoltaic cell.

18. The method of claim 15, wherein overly illuminating the degraded photovoltaic cell reduces the size needed for an array of a plurality of photovoltaic cells including the degraded photovoltaic cell.

19. The method of claim 15, wherein:

the over-illumination increases the electrical energy production capacity of the degraded photovoltaic cell to a level that exceeds the capacity of a good photovoltaic cell illuminated with the average photonic energy of one sun equivalent.

20. The method of claim 19, wherein overly illuminating the degraded photovoltaic cell reduces the size needed for an array of a plurality of photovoltaic cells including the degraded photovoltaic cell.

* * * * *